Sept. 28, 1926.

A. E. AYER 1,600,967

COUNTER MOLDING MACHINE

Filed Sept. 27, 1924 6 Sheets-Sheet 1

Inventor
Albert E. Ayer, Deceased
By Mary A. Ayer
Administratrix
by Wright, Brown, Quinby they
Att'ys

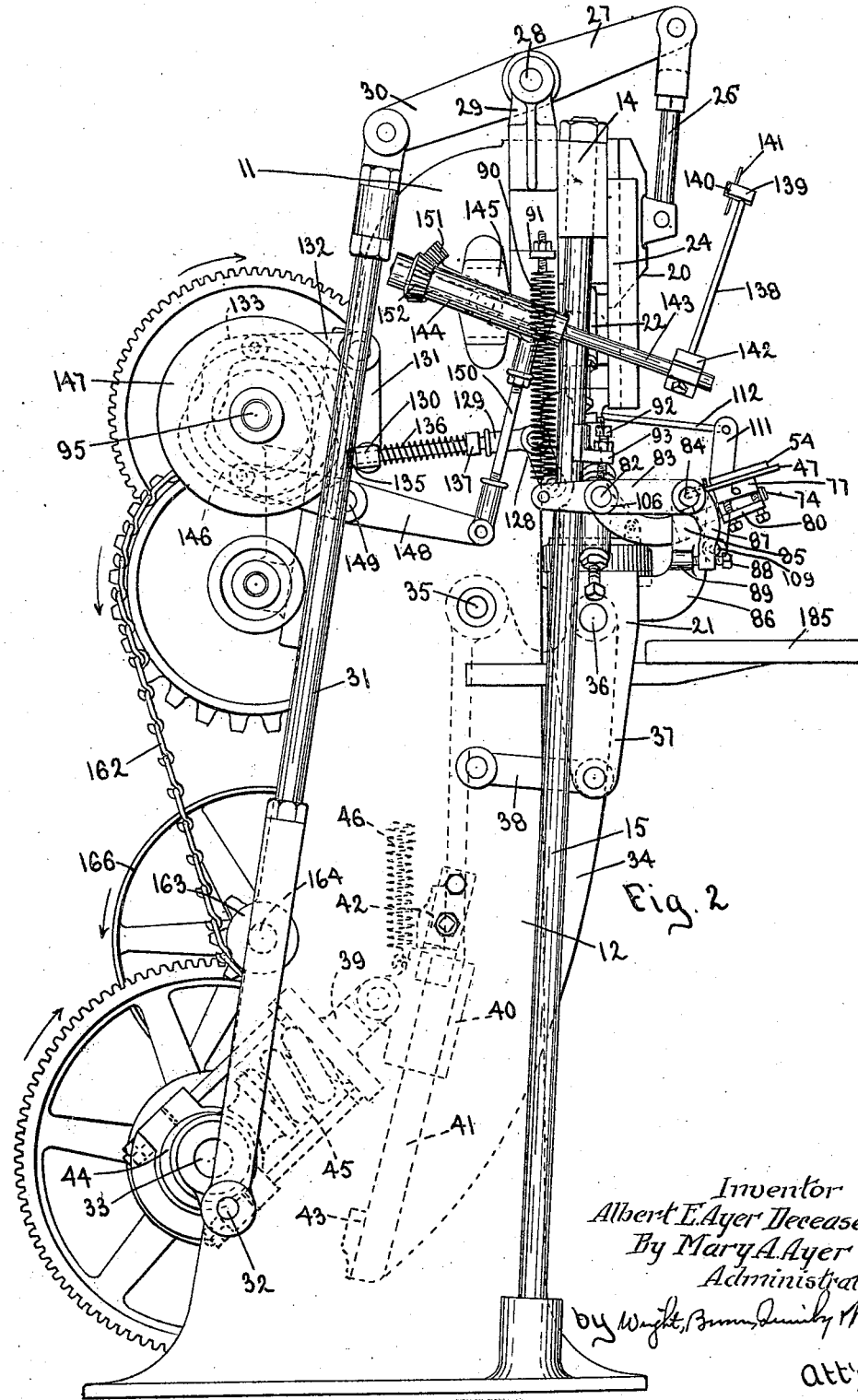

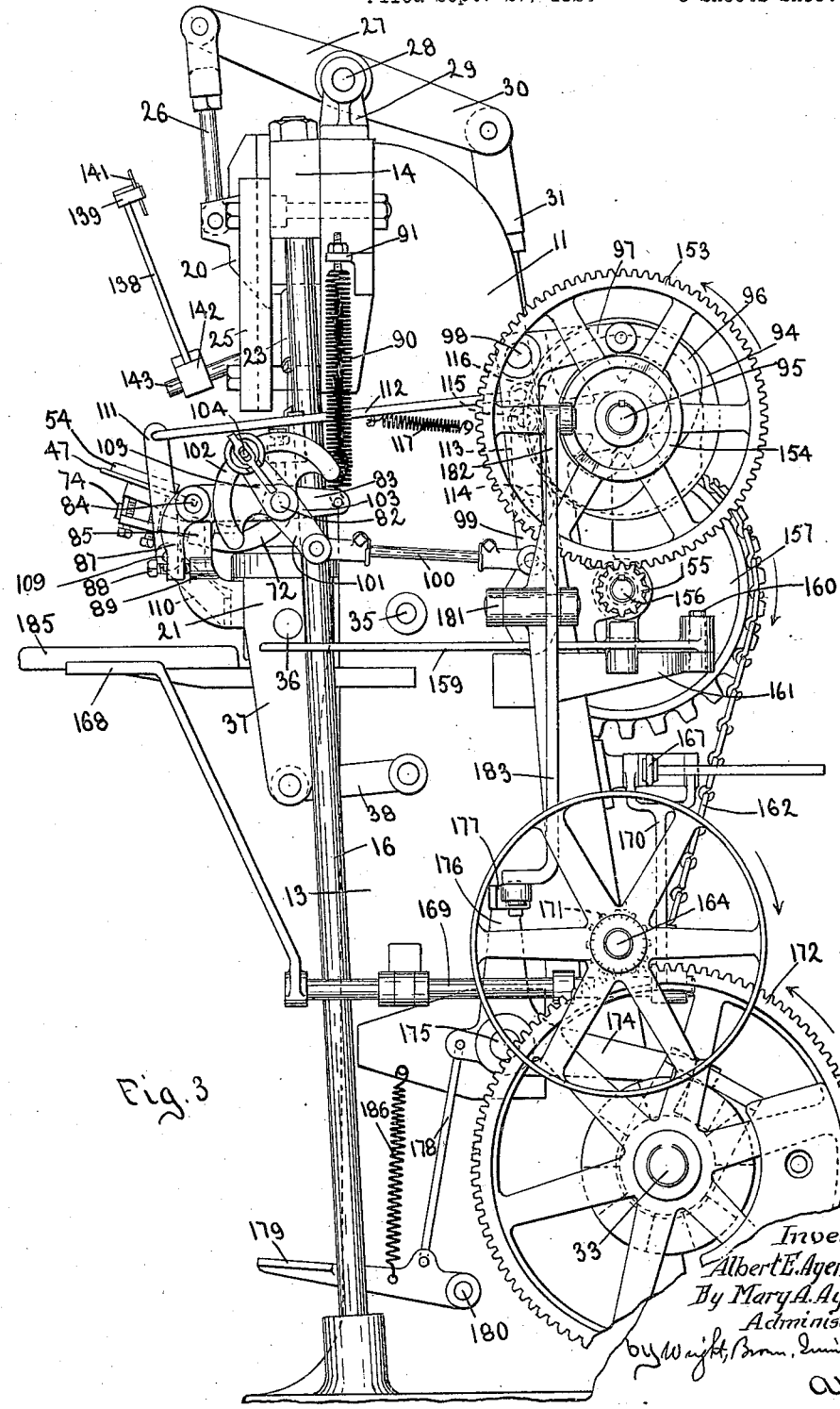

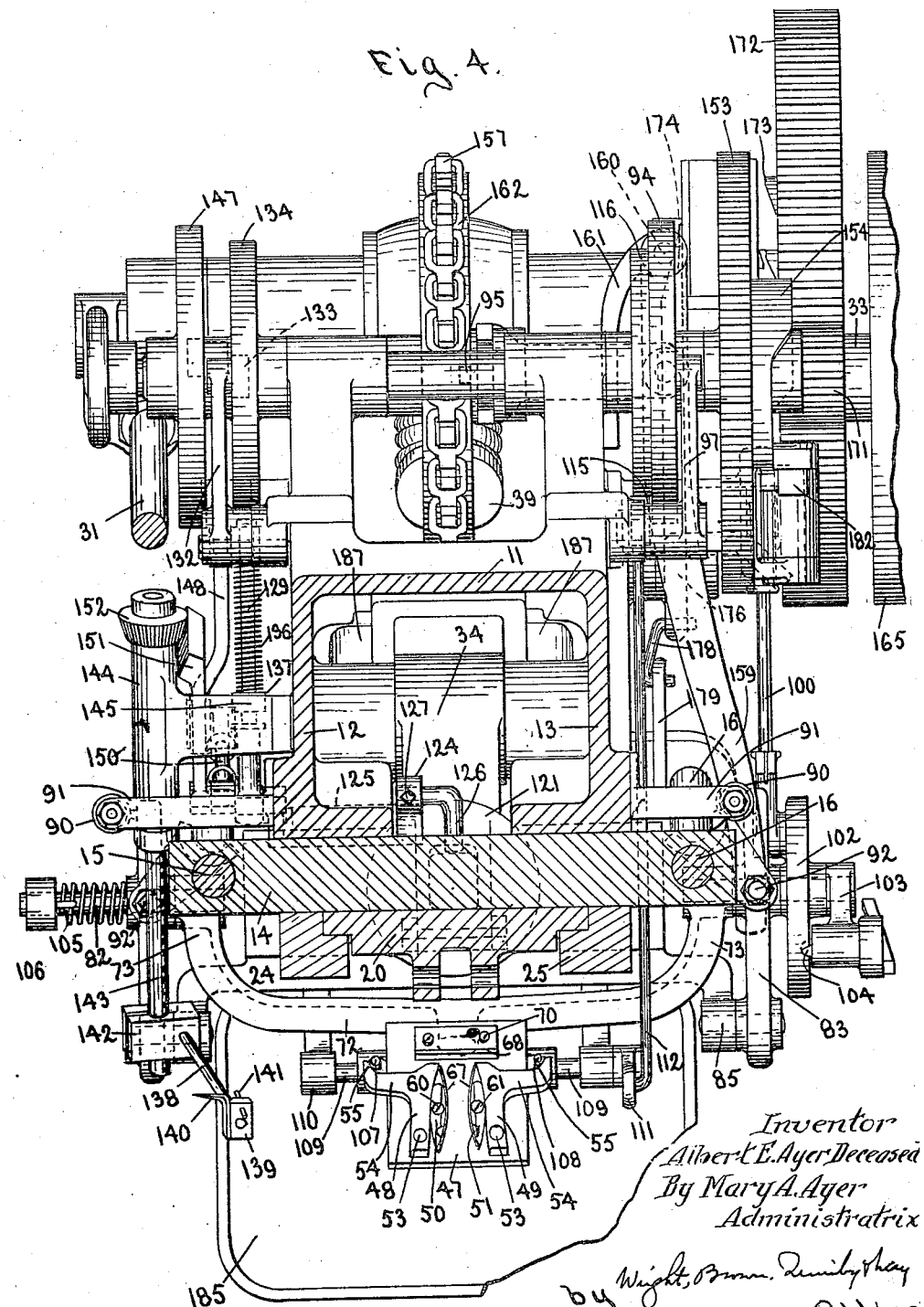

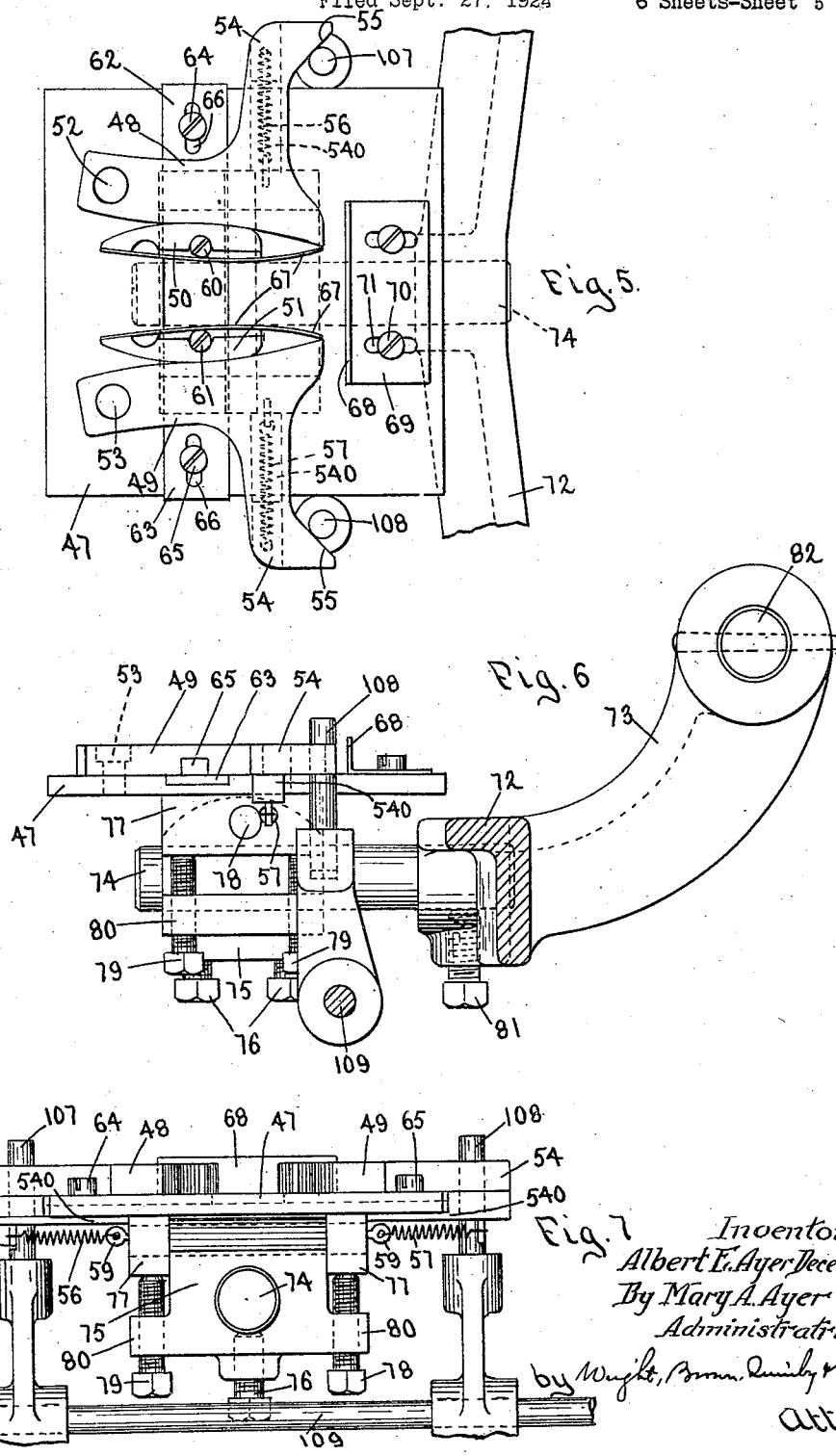

Sept. 28, 1926.  
A. E. AYER  
COUNTER MOLDING MACHINE  
Filed Sept. 27, 1924  
1,600,967  
6 Sheets-Sheet 6
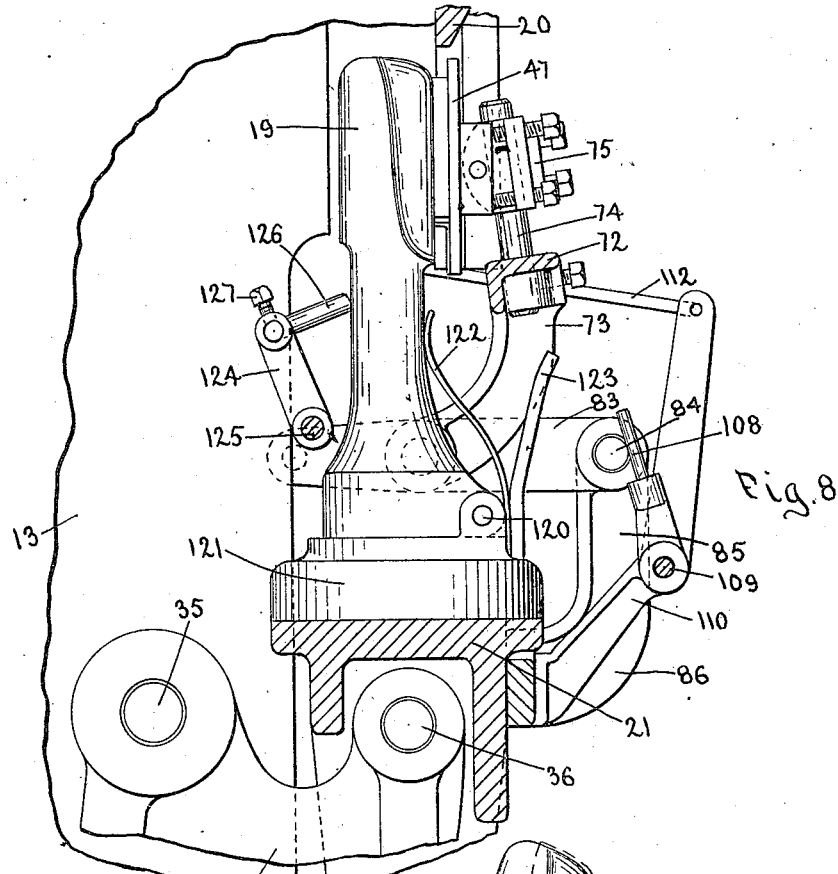
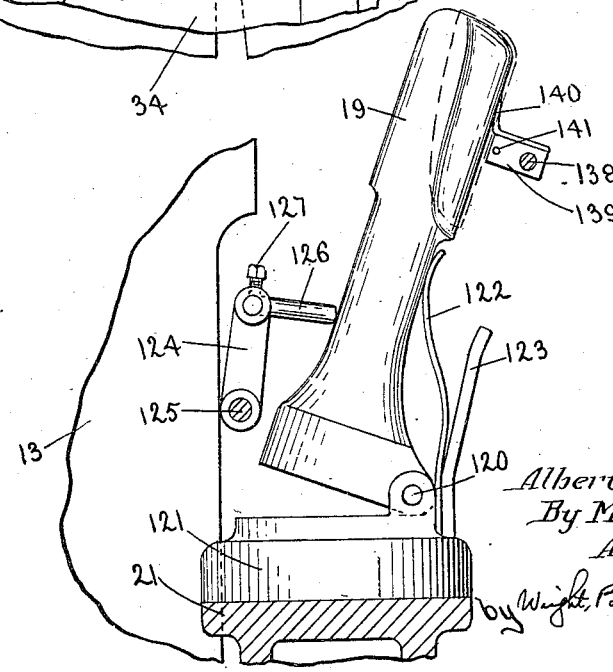
Inventor  
Albert E. Ayer Deceased  
By Mary A. Ayer  
Administratrix  
by Wright, Brown, Quinby & May  
att'ys Patented Sept. 28, 1926.

1,600,967

UNITED STATES PATENT OFFICE.

ALBERT E. AYER, DECEASED, LATE OF WINTHROP, MASSACHUSETTS; BY MARY A. AYER, ADMINISTRATRIX, OF WINTHROP, MASSACHUSETTS, ASSIGNOR TO JOHN HAMMOND STEWART, OF LYNN, MASSACHUSETTS.

COUNTER-MOLDING MACHINE.

Application filed September 27, 1924. Serial No. 740,400.

The present invention relates to machines for molding counters for foot wear and has particular reference to machines of this character in which the counter blanks, having first been placed by the operator in an automatic feeder, are automatically transferred by such feeder to the molding instruments; and in which the molded counters are automatically removed by a stripper.

The principal objects of the invention are to provide improved mechanisms for carrying out and performing the operations of feeding, molding and stripping the counters; and further, to provide a set of controls by which the different mechanisms of the machine may be put into automatic operation and continued interdependently in such operation.

The invention consists in the mechanisms, means and combinations by which the foregoing objects, and secondary objects related thereto, are put into effect, as described in the following specification in connection with the drawings, and in all substantial equivalents of the mechanisms so particularly described.

In the drawings:

Fig. 2 is a side elevation of the machine as seen from the left of Fig. 1;

Fig. 3 is a side elevation of the machine as seen from the right of Fig. 1;

Fig. 4 is a sectional plan of the machine shown on a larger scale than that of the preceding figure, the plane of section being indicated by line 4—4 of Fig. 1;

Fig. 5 is a plan view of the automatic feeder;

Fig. 6 is a side elevation of the feeder, a portion of the frame thereof being shown in cross section;

Fig. 7 is a front elevation of the feeder;

Fig. 8 is a detail view showing the inner member of the molding instruments in elevations, with the feeder and other accessory parts in operative cooperation therewith prior to the molding action;

Fig. 9 is a similar view showing the inner member in position for removal of the molded counter;

Like reference characters designate the same parts wherever they occur in all the figures.

Figure 1:
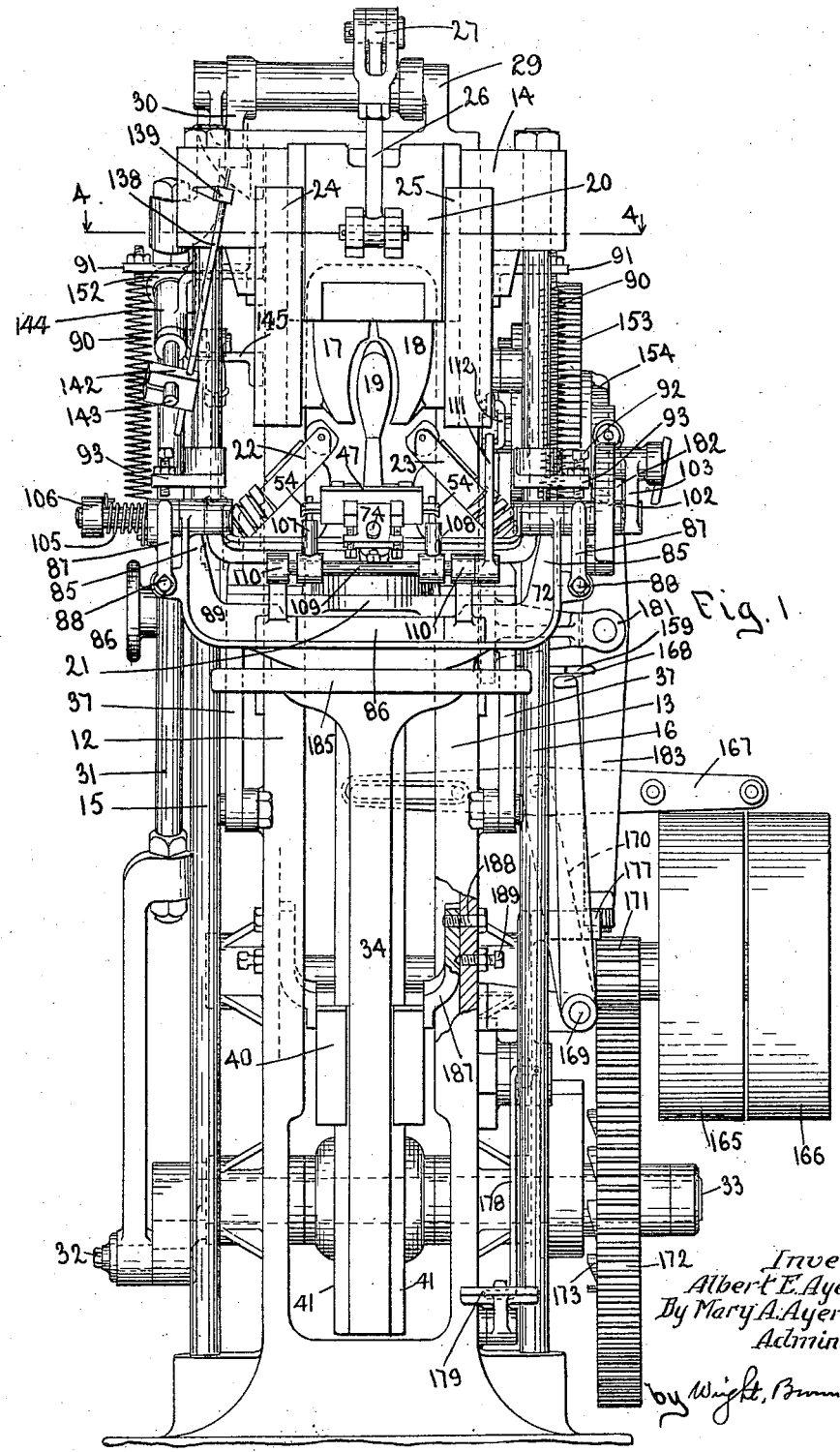
Figure 1 is a front elevation of the preferred form of machine embodying the invention.

The frame of the machine comprises a massive and rigid main body 11, preferably formed as a metal casting, with wings 12 and 13 between which are contained certain of the operating parts as will be presently described. A cross beam 14 is placed across the upper part of the frame body and is secured by tie rods 15 and 16.

The molding instruments comprise two outer mold members 17—18, usually called molds, an inner member 19, usually called a last, and a pressure or wiper 20. These parts will hereinafter be called by their usual terms as above indicated. The function of the molds is to shape the counter blank and grip it firmly on the outside of the last with its edge projecting forwardly, and the function of the wiper is to travel across the projecting edge and turn it over against the front face of the last, forming a flange. The molds are mounted with provision for separation and for closing against the last in the manner usual in this art, for instance that shown in the patents to Stewart No. 467,473, dated January 19, 1892 and No. 826,697 dated July 24, 1906. The last is mounted on a last carrier 21 which is movable up and down for the purpose of forcing the heel end of the counter firmly against the inner end of the mold recess; and the last carrier also carries spring supported wipers 22 and 23 which then bear on the outer parts of the molds and crowd them forcibly against the sides of the last to grip the wings of the interposed counter. The wiper travels in guides 24—25 secured to the beam 14, and is connected by a link 26 with an arm 27 on a shaft 28 which is held in a bracket 29 on the top of the frame, and is oscillated by a second arm 30 and a connecting rod 31 which latter is connected with a crank 32 on a shaft 33.

Up and down motion is given to the last carrier 21 by a lever 34 pivoted between the wings of the frame body on a rod 35 and connected to the carrier by a pin 36. The carrier is provided with arms or wings 37 near its opposite ends which are connected to the frame body by links 38 parallel to the common plane of the pivots 35 and 36 and substantially equivalent length to the distance between said pivots, whereby it is guided and maintained in upright position. Said lever 34 is oscillated by an arm 39 on the shaft 33, which arm is pivoted to a shoe 40 mounted to slide on guide ribs 41 on the lever between stops 42 and 43. Said arm 39 frictionally grips an eccentric 44 on shaft 33 and is carried during a part of each rotation of said shaft from the position shown in Figure 2 to a position in which the shoe 40 abuts against the stop 43 and the arm 39 is then approximately perpendicular to the depending arm of the lever. The last is then raised, and the further movement of the shaft causes the eccentric to exert a powerful direct pressure upon the lever through a heavy spring 45 which forms a part of arm 39. A spring 46 returns the arm 39 to the raised position when this pressure is relaxed.

As thus far described the machine is not essentially different from counter molding machines already known and described in prior patents, to which reference may be had for a more detailed description of all corresponding features.

The counter blanks are placed by the operator in a feeder, and by the latter are transferred to the molding instruments. Said feeder comprises a plate or table 47 having outer clamps 48—49 and inner clamps 50—51 arranged to hold between them the counter blank after it has been bent by the operator into the required form. The outer clamps are pivoted by studs 52 and 53 respectively to the table and are formed with arms 54 which project respectively beyond the opposite side edges of the table and have cam or wedge surfaces 55 whereby said clamps are moved outwardly by instrumentalities later described. Springs 56 and 57 are connected to the respective clamps and to the table beneath the latter, being attached at one end to a pin 58 depending from the clamp and at the other end to an eye 59 secured to the table, as shown best in Figure 7. These springs tend to draw the outer clamps inwardly, the movement being limited by the extensions 540 which are rigidly secured to the arms 54.

The inner clamps 50 and 51 are pivoted by screws 60 and 61 respectively to slides 62 and 63 which occupy an undercut transverse guideway in the plate and are clamped, with provision for in and out adjustment, by means of screws 64 and 65 passing through slots 66 in said slides and threaded into the table. The inner surfaces of the outer clamps conform as to their rear portions approximately to the curve of the counter blank, but as to their forward portions are inclined outwardly to guide the wings of the counter blank into the spaces between the cooperating clamps. The outer surfaces of the inner clamps conform to the curved inside of the counter. These latter clamps do not extend so far to the rear as the outer clamps but are provided with flexible spring strips 67 which extend substantially to the rear terminations of the outer clamps and the function of which is to insure that the wings of the counter blank will be far enough separated to pass over the molding last. In effect these springs are parts of the inner clamps and constitute resilient yielding rear terminals of such clamps. This construction of the inner clamps enables them to conform the counter blank to the outer clamps, and at the same time to grip the blank firmly enough under different conditions of adjustment.

A gage 68 is mounted on the feed table to determine the placing of the blank longitudinally of the clamps. This gage is conveniently formed by the turned up edge of a plate 69 which is adjustably secured to the table by screws 70 passing through slots 71 in said plate. This gage and the clamps extend above the surface of the table only far enough to grip that edge of the counter blank which is bent over to form the flange; wherefore when the blank is grasped by the feeder, that portion of it which is to be compressed between the mold members is wholly clear of the feeder clamps and is free to enter between the mold members.

The feed table above described is adjustably mounted on a feeder carrier, which feeder carrier consists of a bar 72 having rearwardly extending arms 73 at its ends and a forwardly projecting stud 74 at its middle. A block 75 fits freely on said stud and is adapted to be adjusted lengthwise thereon and angularly about the axis of the stud and to be secured in position by set screws 76. The feed table 47 lies over this block and is provided with wings 77 which embrace the ends of the block and are pivoted thereto by a pin 78. The top of the block is convex so as to permit rocking movement of the table about the pivot pin 78. Adjusting screws 79 are mounted in the forward and rear portions of flanges 80 which project at opposite sides of the block 75 and these screws bear against the wings 77 and serve to adjust the table to the particular angle which will bring its blank supporting surface to the desired angle with the molding members when delivering the blank to the latter. The stud 74 is preferably mounted detachably in a socket in the feeder carrier bar 72 and is secured therein by a set screw 81.

The feeder carrier is mounted in a manner permitting its adjustment up and down, or in other words in that direction which will place its clamps in a desired position longitudinally of the molding last when delivering the blank. Therefore the arms 73 of the feeder carrier are secured to shafts 82 which are rotatably mounted in the rearwardly projecting arms of levers 83, which levers are pivoted by means of shafts or rods 84 in arms 85 rising from the opposite ends of a bracket 86 secured to the molding last carrier 21. Each of the levers 83 has an arm 87 through which an adjusting set screw 88 passes to bear against an abutment 89 on the adjacent supporting arm 85. Springs 90 connected to the rearward arms of said levers and to fixed brackets 91 on the frame tend to raise these arms and to press the adjusting screws 88 against their abutments 89. Adjustment limits for the said levers are provided by stop screws 92 held in fixed brackets 93 on the tie rods 15 and 16 and arranged over the rearward arms of said levers.

It will now be apparent that by appropriately adjusting the set screws 88, the pivots 89 for the feeder carrier may be raised and lowered.

The feeder is oscillated to carry blanks to the molding members and return, by means of a cam 94 on a cam shaft 95, which cam has a groove 96 receiving a stud or roll on a bell crank lever 97 which is pivoted to the frame and has a depending arm 99 connected by means of a pitman 100 with an arm 101 which is mounted to turn freely on one of the pivot shafts 82 of the feeder carrier and is connected with a segment or disk 102. Another arm 103 is connected rigidly with the same pivot shaft 82 and carries a latch 104 which occupies, and is removable from, a notch in the side of disk 102 (Fig. 4). Any suitable means for normally retaining said latch in said notch, and means for withdrawing the latch when desired, may be used.

The shaft 82 at the opposite end of the feeder carrier from that to which the arm 103 is connected projects outward and is surrounded by a spring 105, one end of which bears against a collar 106 and the other bears on an abutment on the hub of the adjacent adjusting lever 83—87. This spring tends to raise the feeder and thus partly counter-balances its weight, relieving the operating mechanism, previously described, of part of the work required to raise the feeder.

When the feeder is in its lowered position, the position which it holds most of the time and in which it receives the counter blank from the operator, its outer clamps are separated by the action of the arms 107 and 108 which then stand at opposite sides of the feed table and engage the wedge surfaces 55 of the two outer clamps. These arms are secured to a rock shaft 109 which turns in brackets 110 secured to the molding last carrier, and to which is also secured an operating arm 111, the latter being connected by a link 112 with a lever 113 pivoted at 114 on the frame and carrying a roll 115 in engagement with a cam 116 on the cam shaft 95. A spring 117 is connected to the frame and to the link 112 and serves to hold the roll 115 against its cam. The effect of the cam 116 is to swing the arms 107 and 108 forward after the feeder has returned from transferring a blank to the molds and thereby to separate the outer blank-holding clamps 48—49 from the inner clamps for a long enough time to permit the operator to place a blank between the clamps.

During the molding action the molding last is in the same plane with the molds 17 and 18, but after molding, it is tilted forward out of this plane beside the path of the stripper so that the molded counter may be picked up and carried away by the latter. Referring to Figures 8 and 9, it will be seen that the last is pivoted at its lower end by means of a pivot pin 120 to a pedestal or base block 121 secured to the last carrier 21. The pedestal has an extended wide supporting surface against which the bottom of the last is normally held by a spring 122 in the plane of the complemental molds; such spring being a leaf spring secured at one end to the base and bearing at its other end against the last as shown in Figures 8 and 9. 123 is a rigid reinforcing abutment for the spring. An arm 124 is mounted behind the last on the rock shaft 125 and carries a finger 126, formed from a bent rod secured in a recess in arm 124 by a set screw 127. The rock shaft 125 carries an arm 128 at the left-hand side of the machine, and to the latter arm is connected a rod 129 arranged to slide through an eye 130 in one arm of the bell crank lever 131, the other arm 132 of which carries a roll or stud which occupies a cam groove 133 in a cam disk 134. The connecting rod 129 carries an abutment 135 at the rear of the eye 130, and carries a helical spring 136 in front of this eye, such spring being confined between the eye and an adjustable abutment 137 on the rod. The cam groove 133 has a single jog which is timed to swing the last-displacing finger 126 forwardly after the counter has been molded and the last carrier has descended. This impulse is imparted to the finger in a yielding manner through the spring 136 and against the yielding resistance of the spring 122, these springs being of such strength that, while they so cause and permit the last to swing forward across the path of the stripper, yet the spring 136 yields when the face of the last comes into contact with the stripper, and so avoids bending or breaking the latter.

The stripper is formed of an arm 138 and a head 139 on the end thereof, such head carrying an angle piece 140 which terminates in a point adapted to bear on the outer face of the last and pass between such face and the flange of the counter at the heel end of the latter. Head 139 also carries a cross pin 141 which lies across the wings of the counter and prevents it from slipping forward when the counter is first picked off from the last.

The rod or shank 138 of the stripper is secured adjustably in a block 142, which in turn is clamped adjustably on an inclined shaft 143 which turns in a bearing sleeve 144 secured to the frame by a bracket 145. The inclination of this shaft, together with the adjustment of the stripper shank, causes the stripper to swing in a path far enough in front of the flange presser and its driving rod to clear the latter, but near enough to the last to bring the stripper in contact with the front face thereof when the last is tilted forward. Oscillation of the stripper between a position thus adjacent to the last and one far enough at the left of the machine to cause it to drop the counter is imparted by a cam groove 146 in a cam 147, such groove receiving a stud or roll on a lever 148 which is pivoted at 149 on the frame. Lever 148 is connected by a link or connecting rod 150 with a gear segment 151, and said gear segment meshes with a pinion 152 on the stripper shaft 143. The cam groove 146 is properly designed and timed to place the stripper before the last has been tilted forward, but after the feeder has been returned to normal position following its feeding stroke, and then, after the last has been tilted forward, to carry the stripper away to its discharging position.

All of the cams hereinbefore mentioned are secured to the same cam shaft 95, on which there is secured also a gear 153 and a cam 154. Gear 153 meshes with a pinion 155 on a shaft 156. A sprocket wheel 157 is loosely mounted on shaft 156 and is adapted to be connected to stud shaft by means of a clutch under control of a manually operated lever 159 which is pivoted to a stud 160 on a bracket 161 projecting to the rear of the machine as shown in Figure 3, the clutch here used may be any one of a number of well-known forms of clutch, for instance a collar splined on the shaft and having a tooth or equivalent abutment adapted to be brought into or out of the path of a complemental tooth or abutment on the hub of the sprocket wheel under control of the lever 159, with or without the aid of a spring. I have not illustrated the clutch here since clutches suitable for the purpose are well-known to those skilled in the art.

Sprocket wheel 157 is coupled by a chain 162 with a sprocket wheel 163 on a pulley shaft 164 on which is mounted a fast pulley 165 and a loose pulley 166. A belt shipper 167 is movable by a manually operable arm 168 on a rock shaft 169, to which shaft is connected a second arm 170 which is connected also with the shipper.

Shaft 164 carries a gear pinion 171 in mesh with a large gear 172 on the crank shaft 33 previously described. Said gear 172 is loose on the shaft and carries one member of a ratchet clutch 173, the complemental member of which is secured to the shaft 33 and is controlled by the arm 174 of a bell crank lever which is pivoted at 175 to the machine frame and has a second arm 176 provided with an inclined wedge surface 177. This bell crank lever is connected by a link 178 with a treadle 179 pivoted to frame at 180. An upright lever is pivoted in a bracket 181 and has an arm 182 which bears on the cam 154, and a second arm 183 which bears on the wedge surface 177.

When treadle 179 is pressed upon, the arm 174 is raised so as to cause coupling of the clutch which connects gear 172 to the crank shaft 33. The outthrust of cam 154 on lever arm 182 causes the arm 183 of the same lever to act on the wedge surface 177. When the treadle is left free, and at the same time the low part of cam 154 releases the lever 182—183, the control lever 174—176 is caused by a spring 186 (which is connected to treadle 179 and to a fixed anchor pin) to assume the position shown in Figure 3 wherein it uncouples the crank shaft clutch and causes this shaft to be brought to rest. A clutch-coupling and stop mechanism of a character well-known in the art is used for this purpose and is therefore not herein shown or described in detail.

The part designated 185 is a table convenient to the operator's hands on which may be placed the blanks to be molded. In order to start the machine, assuming that it is wholly at rest, the operator by means of the shipper handle 168 shifts the belt from the loose to the fast pulley. This sets in motion the gear wheel 172 and the sprocket wheel 157, but does not start either the crank shaft 33 or the cam shaft 95, the clutches for driving these shafts being disconnected. Then by moving the lever 159 in the proper direction, the operator causes the clutch between the sprocket wheel 157 and shaft 156 to be connected, thus setting the cam shaft 95 and the cams thereon in rotation. At this time the low part of cam 154 is beside the roll or stud on lever arm 182, because the stop mechanism is organized to disconnect the clutch and stop the moving parts when said cam is in that position. When the high part of cam 154 arrives beside the arm 182, it displaces this arm and causes the other arm 183 of the same lever to shift the bell crank 176—174, by pressing against the inclined wedge surface 177, thus causing the clutch between shaft 33 and gear 172 to be connected and setting said shaft in rotation. Cam 154 is properly positioned to cause shaft 33 thus to be set in rotation at such a time as will cause the movements given by this shaft to take place in proper timing with the movements of the other parts which are controlled by the cams on cam shaft 95.

The speed ratio between the pulley shaft 164 and the cam shaft 95 is one-half the value of the speed ratio between shaft 164 and crank shaft 33; in other words the crank shaft is driven at twice the speed of the cam shaft. Thus the molding members and the flange presser make two cycles of operation while the mechanisms driven from the cam shaft make one cycle. The operator picks up the counter blanks one by one, bends them into the approximate outline of the molded counter and, when the feeder is in the lowered position and the clamps thereon are open, places the blank with its opposite wings between the opposite pair of cooperating clamps 48—50 and 49—51 respectively, and the tips of such wings against the gage 68. Withdrawal of the clamp-opening arms 107 and 108, accomplished by the spring 117 under control of cam 116, allows the clamps to grip the counter blank, and then the feeder is caused by the cam 94 to move into the position shown in Figure 8, placing the counter blank over the molding last 19, and between the molds 17 and 18, at a time when these molds are separated and the last is lowered, withdrawing immediately afterward and leaving the blank gripped between the molding members, which have been brought together in the meantime. After the feeder arrives in its lowered position, the clamp-spreading arms are swung forward to open the outer clamps, and they remain so until shortly before the feeder makes its next trip, giving ample time for the operator to place a blank between the clamps.

After the flange presser has made its first travel the last and outer molds are relaxed and again forced together to mold the counter a second time and the presser makes a second pass across the molds. Then the molds are opened, the molding last is lowered and swung forward, and the stripper is operated to remove the molded counter.

Finally, upon completion of the cycle of the cam shaft, the low part of cam 154 allows the lever arm 182 to recede, freeing the bell crank lever 176—174, and allowing the arm 174 to be put into position for stopping the crank shaft under the impulsion of a spring 186 which raises the treadle 179, unless the operator continues to press on said treadle. But if the operator wishes the machine to keep in action continuously without stopping, he may cause it to do so by holding the treadle depressed.

Descending movement of the molding last is effected by backward movement of the lower end of the last carrier lever 34, which in turn is effected by upward movement of the arm 39, and is arrested by slide 40 arriving at the stop 42. In order that the arm and slide may not bound back after being thus arrested, two friction grippers 187 are mounted, one on either side of the uppermost position of the slide 40, as shown in Figure 1, and are adjusted so as to bear against the opposite sides of the slide. Each of these members is loosely connected to the adjacent wing (12 or 13) of the frame by a bolt 188 and is adjusted so as to bear with greater or less pressure on the slide by means of an abutment screw 189 threaded into said wing and the end of which enters a socket in the adjacent side of the brake member.

What I claim and desire to secure by Letters Patent is:

1. A counter molding machine comprising in combination with molding instrumentalities and a feeder for carrying counter blanks to said instrumentalities, inner and outer clamps mounted on said feeder arranged to grip the wings of a counter blank when in bent formation, and automatic mechanism for separating said outer clamps from the inner clamps when the feeder is in blank-receiving position.

2. In a counter molding machine, a counter blank feeder comprising a support, inner blank holding clamps mounted on said support in a normally stationary position with provision for being set in positions at different distances from one another and also being pivotally mounted between their ends, and outer clamps each complemental to one of the inner clamps pivoted to the support adjacent to one end and being movable about their pivots away from the adjacent inner clamps.

3. In a counter molding machine a counter blank feeder comprising a table, outer clamps pivoted over the supporting surface of said table adjacent to their forward ends, springs arranged to act on said clamps with tendency to move their rear ends inward, and inner clamps pivotally mounted on the table in a manner permitting them to conform to the positions of the outer clamps.

4. In a counter molding machine a counter blank feeder comprising a supporting table, outer clamps each pivoted adjacent to one of its ends to the table and having inner clamping surfaces approximating the curvature of the outer sides of the wings of a molded counter, springs acting on said clamps tending to move their non-pivoted ends inwardly, inner clamps complemental respectively to the outer clamps and mounted on the table, and means for shifting said inner clamps to conform with wider or narrower counters.

5. In a counter molding machine a counter blank feeder comprising a support, laterally adjustable and pivotally mounted inner clamps for holding the wings of a bent counter blank, and pivotally mounted outer clamps cooperating with said inner clamps to grip the wings of such bent blank, the outer clamps being pivoted adjacent to one end and the inner clamps being pivoted between their ends and having flexible terminal sections adjacent to the ends of the outer clamps remote from the pivots of the latter.

6. In a counter molding machine as set forth in claim 1 outwardly extending arms on said outer clamps, the mechanism for moving the said clamps outwardly comprising displacer members arranged to contact with said arms when the feeder is in blank receiving position and an operating mechanism for said displacer members.

7. In a counter molding machine an oscillatively mounted feeder including inner and outer blank holding clamps, the outer clamps of which are movable inwardly and have outwardly extending arms, movably mounted displacer members arranged in a location which causes them to lie beside the said clamp arms when the feeder is in one of its positions, and mechanism for moving said displacer members at such times, the displacer members and clamp arms having complemental wedge portions arranged to cause outward movement of the clamps in consequence of said movements of the displacer members.

8. In a counter molding machine a blank feeder comprising an oscillatively mounted and movable frame having a projecting post, a table mounted upon said post with provision for adjustment thereon, and counter blank holding clamps on said table.

9. In a counter molding machine a counter blank feeder comprising an oscillative frame having a projecting post, a block mounted on said post with provision for adjustment lengthwise and angularly thereon, a table pivoted to said block and adapted to turn about an axis transverse to the post, and holding clamps on said table.

10. In a counter molding machine in combination with molding instrumentalities, a feeder adapted to transfer counter blanks from a receiving position to said instrumentalities, supporting means on which said feeder is oscillatively mounted, and means for adjusting said supporting means so as to adjust the feeder into conformity with the molding instrumentalities.

11. In a counter molding machine as set forth in claim 10 supporting means for the oscillative feeder comprising pivoted levers to which the feeder is pivoted, said levers being adjustable in a manner to cause shifting of the feeder pivot.

12. In a counter molding machine as set forth in claim 10 a stationary bracket, feeder supporting levers pivoted to said bracket, the feeder being pivoted to said levers at one side of the pivots of the latter, and adjusting means connected with said levers and operable to turn them about their own pivots, whereby the pivot axis of the feeder is shifted.

13. In a counter molding machine an oscillative blank feeder, a notched disk rigidly connected to said feeder, and means for moving the feeder comprising a positively driven arm mounted to turn about the axis of the feeder and a latch on said arm removably interlocked with the said notched disk.

14. In a counter molding machine including molding instrumentalities, an automatic stripper for removing the molded counters comprising an oscillative shaft, a stripper mounted on said shaft to project laterally therefrom in a position causing it to travel in a path beside the position occupied by the molding last after completion of the molding operation, and automatic mechanism constructed and arranged to give a back and forth oscillation to said stripper first into a position beside the last and then into a discharging position at a distance from said last.

15. In a counter molding machine having a stripper mechanism as set forth in claim 14, the means for oscillating said stripper which comprises a pinion on the stripper shaft, a gear segment in mesh with said pinion, and cam operated mechanism connected with said segment and organized to give a back and forth oscillation thereto.

16. In a counter molding machine a stripper mechanism as set forth in claim 14 and in which the stripper comprises a shank, a head mounted on said shank, a tapered projection at one side of said head in a position to pass between the outer face of the molding last and the flange of the counter at a point near the rear end of the counter, and projections on the head arranged to extend across the flange of the counter.

17. In a counter molding machine having complemental outer molds and a molding last, said last being mounted with provision for tilting forward from the plane of said molds, means for so tilting the last comprising an arm mounted beside the last and rotatable in a direction for applying forward thrust thereto, a rock shaft on which said arm is secured, and cam controlled mechanism connected with said rock shaft and organized to oscillate the same.

18. In a counter molding machine having complemental outer molds and a molding last, said last being mounted with provision for tilting forward from the plane of said molds, means for so tilting the last comprising an arm mounted beside the last and rotatable in a direction for applying forward thrust thereto, a rock shaft on which said arm is secured, and cam controlled mechanism connected with said rock shaft and organized to oscillate the same, combined with a spring bearing against the last with a tendency to return the last to its molding position.

19. In a counter molding machine molding instrumentalities comprising outer molds and a last or inner mold, a carrier for said last to which the last is pivoted with provision for swinging forwardly from its molding position, said carrier and last having abutting surfaces arranged to sustain the molding pressure, a spring mounted on the last carrier and bearing on the last with a tendency to hold it in its molding position and to return it to such position after displacement therefrom, and means for tilting said last forwardly against the opposition of said spring, comprising a cam, a rock shaft movable oscillatively by said cam, and an arm mounted on said rock shaft and arranged to apply forward thrust to said last when moved in one direction, and being otherwise unconnected with the last.

20. In a counter molding machine a last carrier, a lever connected to said carrier for raising and lowering the same, an operating arm for said lever, a slide pivoted to said arm and arranged to travel on said lever, a spring for returning said arm after application therethrough of molding pressure to the last, and frictional gripping means arranged to grasp said slide at the end of the return movement thereof.

21. In a counter molding machine as set forth in claim 20, the gripping means comprising plates or brake shoes mounted on the frame of the machine at opposite sides of the slide when at one end of its travel, said shoes being adjustable to exert friction-causing pressure on the slide.

22. A counter molding machine comprising counter molding members, a feeder for presenting counter blanks to said molding member, a crank shaft for actuating said molding members, a cam shaft for actuating said feeder, a power-receiving shaft, separate driving trains from said power shaft to the crank shaft and cam shaft respectively, separate clutching means for coupling said trains to their respective shafts, and mechanism controlled by the cam shaft for controlling the clutching means of the crank shaft.

23. In a counter molding machine the combination with the mechanism as set forth in claim 22 of operator-controlled means for maintaining connection of the crank shaft clutch.

24. In a counter molding machine, molding members including a flange presser, a crank shaft having connections with all of said members for operating them, a feeder for the counter blanks to be molded, a stripper for removing molded counters from the molding members, a cam shaft including cams connected to operate said feeder and stripper, driving trains for said shafts, separate coupling means, each under the control of the operator for connecting the said shafts with their respective driving trains, and an intermediate controller operable by the cam shaft for exerting control over the coupling means of the crank shaft.

In testimony whereof I have affixed my signature.

MARY A. AYER,
*Administratrix of*
*Albert E. Ayer, Deceased.*